Sept. 22, 1970 H. J. KAMNER 3,529,640
TREE HARVESTING AND PROCESSING DEVICES
Filed Aug. 6, 1968 5 Sheets-Sheet 5

INVENTOR
HAIM J. KAMNER
Carl C. Baty
ATTY.

United States Patent Office 3,529,640
Patented Sept. 22, 1970

3,529,640
TREE HARVESTING AND PROCESSING DEVICES
Haim J. Kamner, Chicago, Ill., assignor to Baldwin-Lima-Hamilton Corporation, Chicago, Ill., a corporation of Delaware
Filed Aug. 6, 1968, Ser. No. 750,701
Int. Cl. A01g 23/02
U.S. Cl. 144—3                                    7 Claims

ABSTRACT OF THE DISCLOSURE

A movement equalizing means for a double-bladed tree harvesting shear wherein parallel linkage means are pivotally connected to one of the blades and the shear frame to assure equalized movements of both blades by single hydraulic cylinder connected therebetween.

BACKGROUND OF THE INVENTION

This invention relates generally to tree harvesting and processing devices and, more specifically to tree harvesting shears.

In applicant's assignee's copending application by Sutherland, Ser. No. 692,749, filed Dec. 22, 1967, entitled "Tree Harvester," a novel apparatus is disclosed which includes a harvesting and processing device supported on a telescopic boom. The device comprises upper and lower sections, each including a hydraulically actuated tree shear and clamp for clamping the device to a standing tree and subsequently topping, delimbing, scoring and bucking a tree into pulpwood lengths or bolts. The upper and lower sections are relatively vertically movable by vertical hydraulic cylinders to facilitate a step-by-step harvesting action as the device is moved down a standing tree.

Operation of the device, which may be automatically performed in proper sequence, may be generally summarized as follows. After initial positioning of the device to embrace a tree to be harvested, adjacent the top thereof, the top clamp is actuated to grasp the tree and support the entire device thereon. The telescopic boom is placed in a float condition. The upper shear is partially closed to bite into the tree top to a slight degree to aid in fixing the upper section of the device. Susequently, the vertical cylinders may be extended whereby the lower section is forcefully lowered to an extent limited by maximum extension of these cylinders. In this manner, a portion of the tree embraced by the lower section during such movement is delimbed and scored. The lower clamp is then set, the upper shear actuated to completely sever the top of the tree, which is discarded, the upper clamp and shear opened, and the vertical cylinders retracted to move the upper section to a lower portion of the tree adjacent the lower section. The sequence of operation may be automatically repeated to move the device down the tree in a step-by-step manner and a kicker means may be provided to direct the fall of a series of bolts into a chute mounted on the telescopic boom which conveys the bolts to a collection area or means. Such compact tree harvesting and processing devices are particularly advantageous over the prior art devices which generally have been large, complex, expensive and so cumbersome that, as a practical matter, they could not be conveniently maneuvered in a forest to be harvested.

To assure proper orientation and wedging action of the shears of a harvester according to the present invention, as well as to assure proper felling direction of bolts, is important that the two blades of each shear close in synchronization. However, because the shear blades are hydraulically energized, a condition sometimes arises wherein one shear blade of a pair may tend to move while the other temporarily remains stationary, as for example, when the said other blade encounters an added resistance. In such a condition, the magnitude of hydraulic pressure required to move the first blade is less than that required to move the second. Consequently, the first blade may tend to move and bite into the tree prior to the second and thereby tend to displace the device and interfere with smooth or automatic sequential operation. Prior efforts to circumvent this problem have not proved satisfactory.

SUMMARY OF THE INVENTION

It is a general object of the present invention to provide a tree harvesting and processing device of the type heretofore described which circumvents and minimizes the problems noted above.

In achieving this general object, the present invention provides an equalizing means for a double-bladed tree harvesting shear including first and second shear blades moveably mounted on a shear frame. Fluid motor means for moving the shear blades are provided, as well as connecting means connecting the fluid motor means to the first and second shear blades. To assure equalized movement of the shear blades, equalizing rod means of a parallel linkage type are pivotally connected to the frame and the connecting means whereby movement of both blades will be maintained in unison.

BRIEF DESCRIPTION OF THE DRAWINGS

A more thorough understanding of one embodiment of the present invention may be gained by reference to the accompanying drawings, in which.

DETAILED DESCRIPTION OF THE INVENTION

Figure 1:
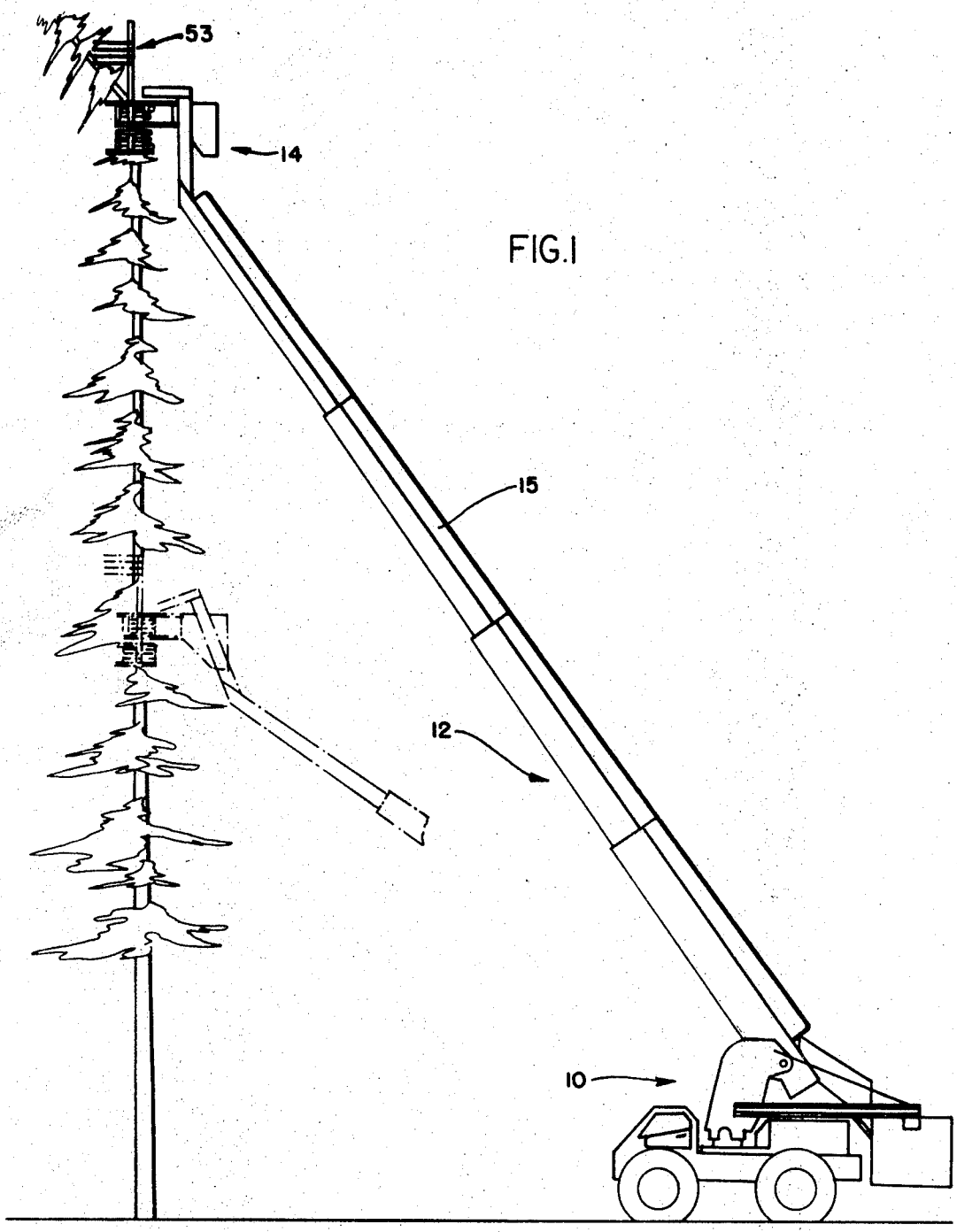
FIG. 1 is an elevational view showing in full lines a tree harvesting and processing device according to the present invention positioned adjacent the top of the tree and a fragmentary showing in phantom line of the device after a few bolts have been harvested from the tree.

Referring in more detail to FIG. 1 of the drawings, the tree harvesting and processing device forming the basis of the present invention, as generally disclosed in the previous identified Sutherland application, comprises a self-propelled, crane-type vehicle 10, on which an extensible boom 12 is mounted. The boom 12 may be of the hydraulically actuated, telescopic type and is pivotally supported on the vehicle 10 for sweeping movement in vertical and horizontal directions for harvesting standing trees in a generally semi-circular area about the front of the vehicle. On the upper or free end of the boom 12, a tree shear and clamp assembly 14 is provided for topping, delimbing, scoring and severing or bucking a standing tree into pulpwood lengths or bolts.

A telescopic conveyor 15 is provided to direct severed or sheared bolts to a collection area or means.

Figure 2:
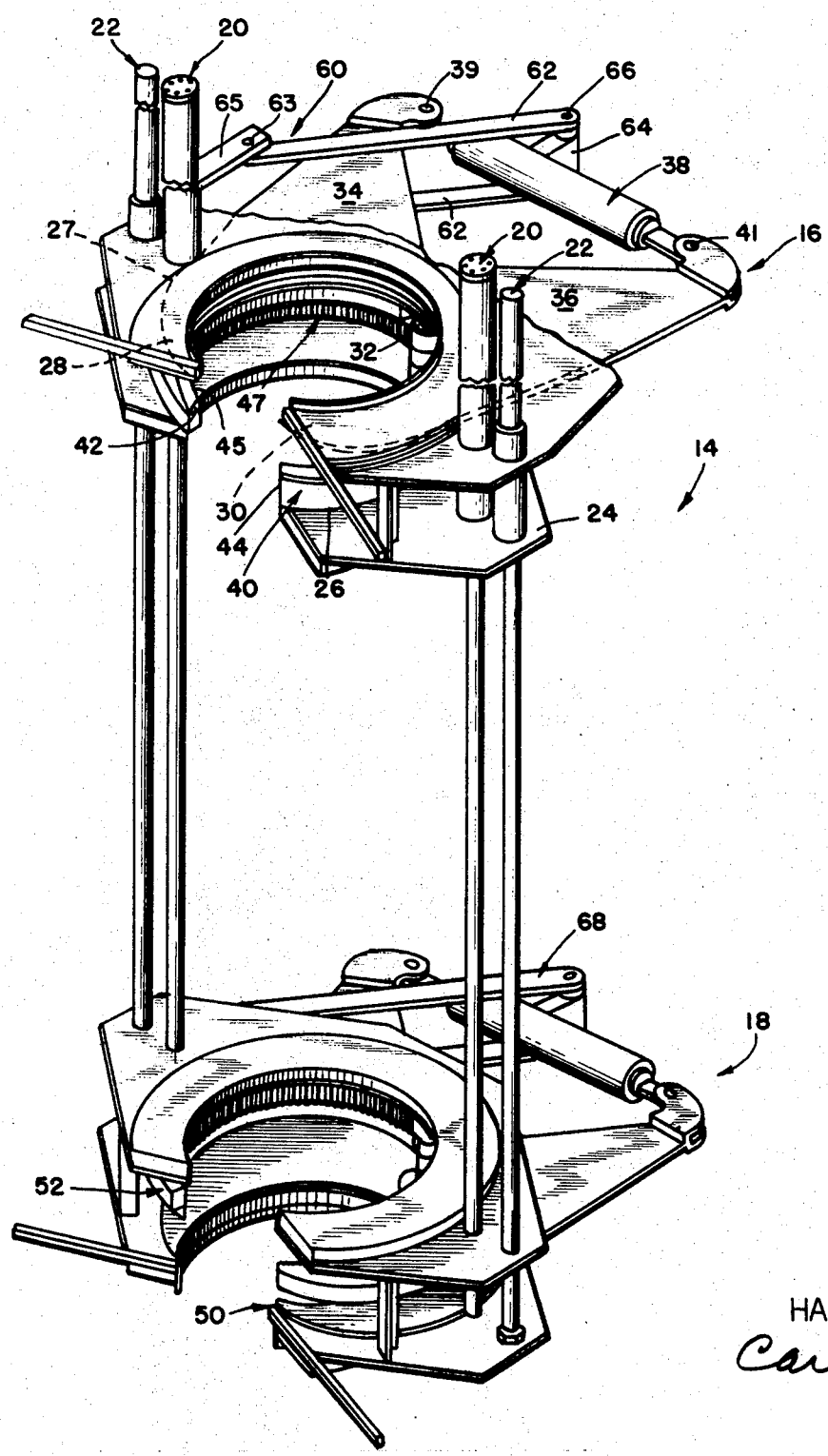
FIG. 2 is a fragmentary, perspective view from the front of a tree shear and clamp assembly shown in its extended condition of the device shown in FIG. 1.

With reference to FIG. 2 of the drawings, the tree shear and clamp assembly 14 comprises upper and lower sections 16 and 18 connected together for relative vertical movement by a pair of vertically extending double-acting hydraulic cylinders 20 and guide rods 22.

The upper section comprises a frame 24 having an arcuate recess 26 therein which is adapted to embrace a standing tree. An upper shear 27 is provided, this shear including a pair of shear blades 28 and 30 having arcuate shearing surfaces on their forward ends adjacent the recess 26. The blades 28 and 30 are pivotally mounted intermediate their length on the frame 24 by a common vertical pivot pin 32. The inner or rear ends 34 and 36 of the blades 28 and 30 extend rearwardly beyond the pin 32 and a double-acting, upper shear hydraulic cylinder assembly 38 is positioned there-between. The cylinder and rod ends of the cylinder assembly 38 are pivotally connected by cylinder pins 39 and 41 to the rear ends 34 and 36 of the blades 28 and 30 respectively, whereby extension or retraction of the cylinder assembly 38 pivots the blades 28 and 30 about the pivot pin 32 to close and pen the shear assembly in a scissor-like manner.

Positioned on the frame 24 immediately below the shear 27 is an upper tree clamp 40. The upper clamp 40 comprises a pair of arcuate jaws 42 and 44 pivotally mounted on a lower portion of the pivot pin 32. The clamp jaws 42 and 44 may include on their forward ends arcuate, vertical extending delimbing blades 45, as well as circularly arranged, horizontally, and inwardly directed bark scoring teeth 47.

Figure 5:
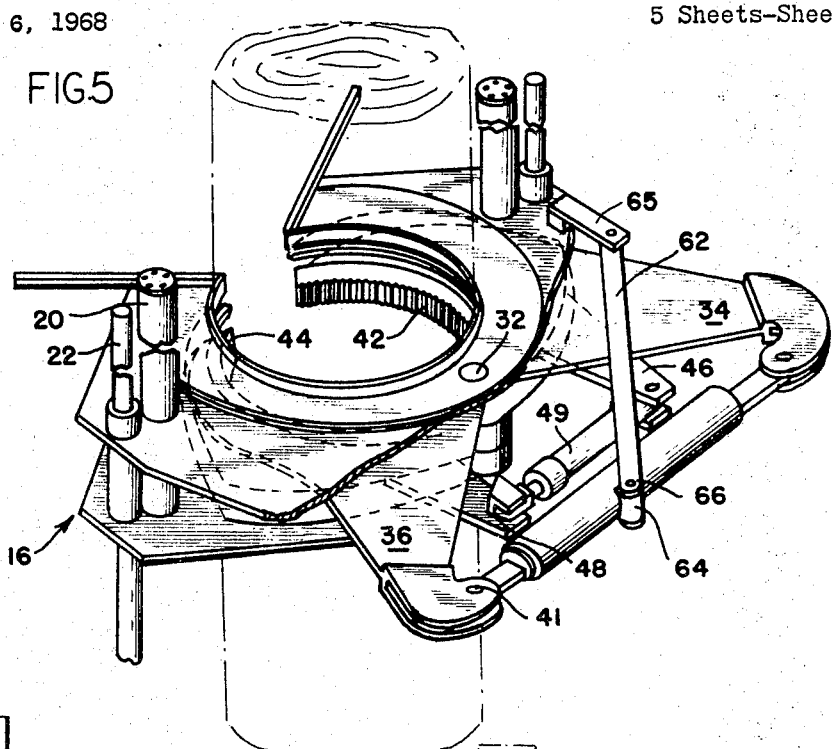
FIG. 5 is a fragmentary, perspective view from the rear of the shear and clamp assembly shown in FIG. 2, illustrated adjacent a tree in a position appropriate for a severing operation.
Figure 6:
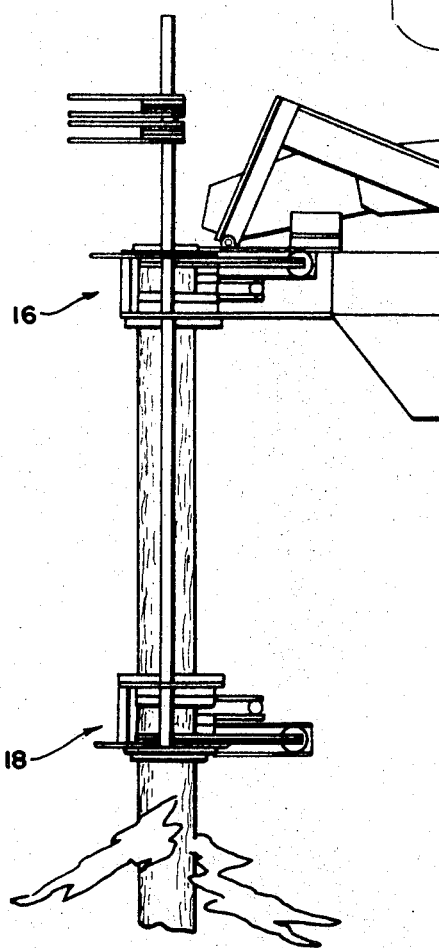
FIG. 6 is a schematic, elevational view of the shear and clamp assembly after a bolt has been cut and the lower section is extended to a lower position.
Figure 7:
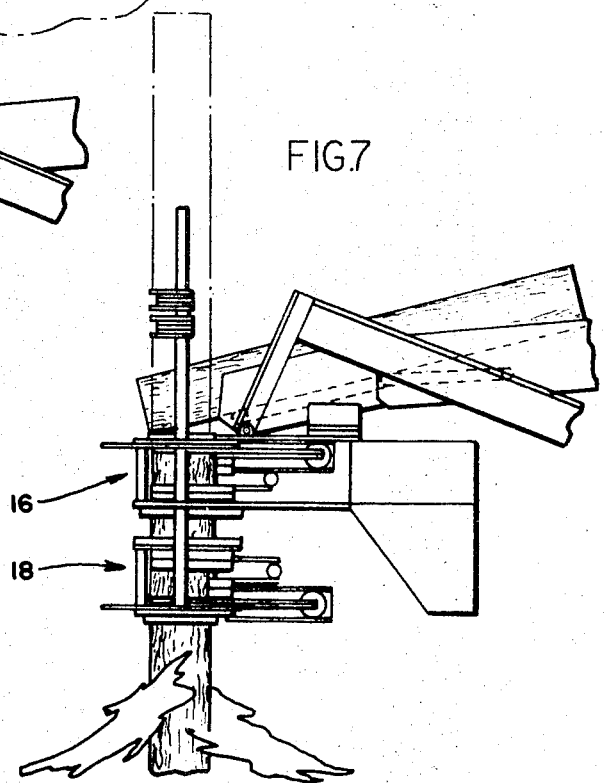
FIG. 7 is a schematic, elevational view similar to that shown in FIG. 6 but wherein the upper and lower sections are retracted to positions adjacent each other, as prior to a next cutting or severing operation of a sequence.

Referring to FIG. 5, the inner or rear ends 46, 48 of the jaws 42, 44, extend rearwardly beyond the pivot pin 32 and a double-acting hydraulic cylinder 49 is connected therebetween in a manner similar to the connection of the upper shear cylinder assembly 38.

The lower section 18 of the device, as shown in FIG. 2, comprises a lower shear 50 and clamp 52 similar in construction and operation to the upper shear 27 and upper clamp 40, except that the lower shear 50 is positioned below the lower clamp 52 to facilitate severing a tree as closely as possible to the ground level.

Figure 3:
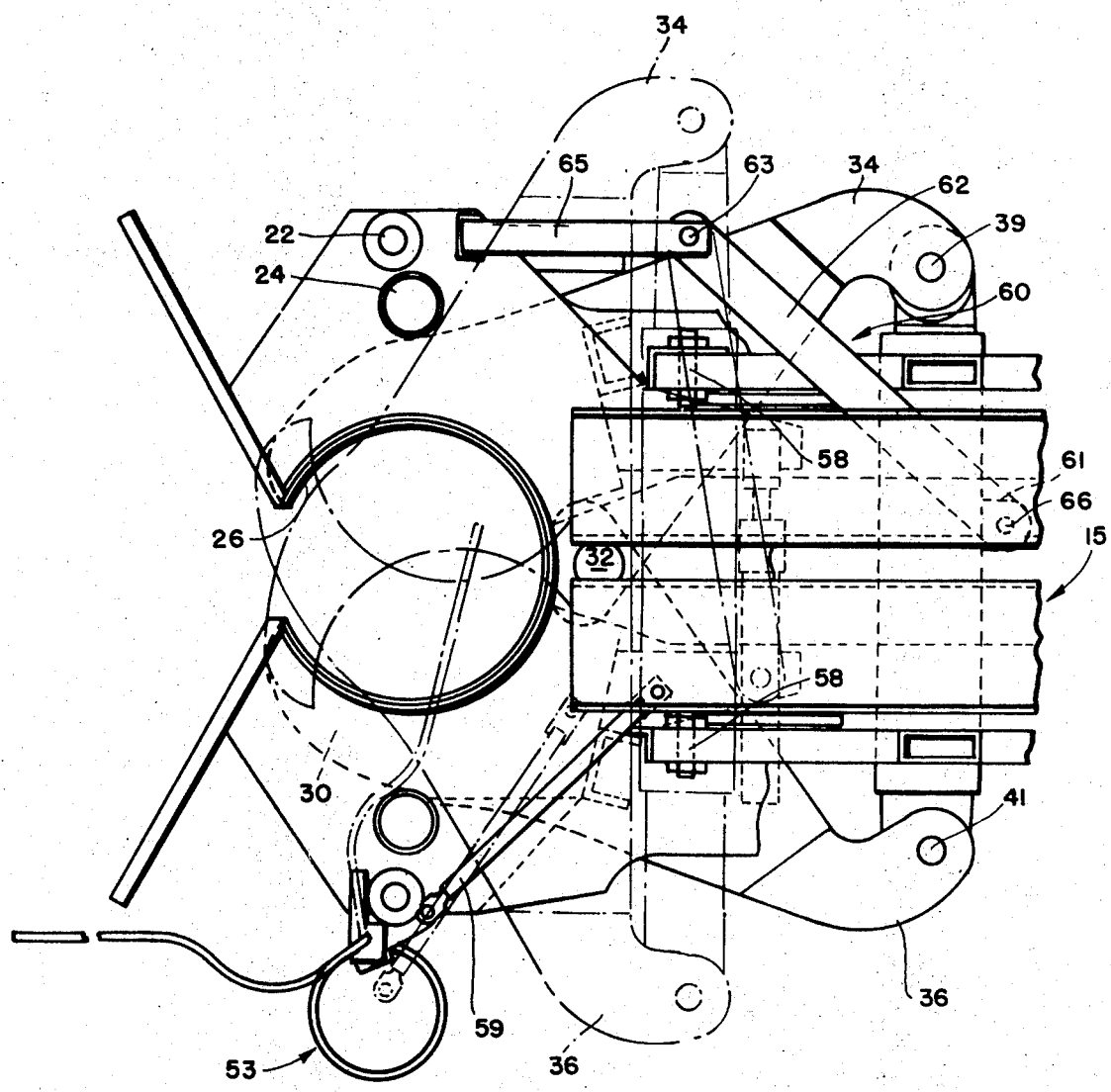
FIG. 3 is a fragmentary top view of the tree shear and clamp assembly shown in FIG. 2, shown in the open condition in full line and including a phantom line showing of the assembly in its closed position.

A spring-loaded bolt kicker or fall director 53 is mounted on and above the frame 24, the kicker being operationally connected by a link 59 to the blade 30 so that upon closing the blades a curved kicker arm 54 will pivot in a counterclockwise direction (as shown in FIG. 3) across the recess 26 thereby directing the fall of a severed bolt to ward the chute 15.

Figure 4:
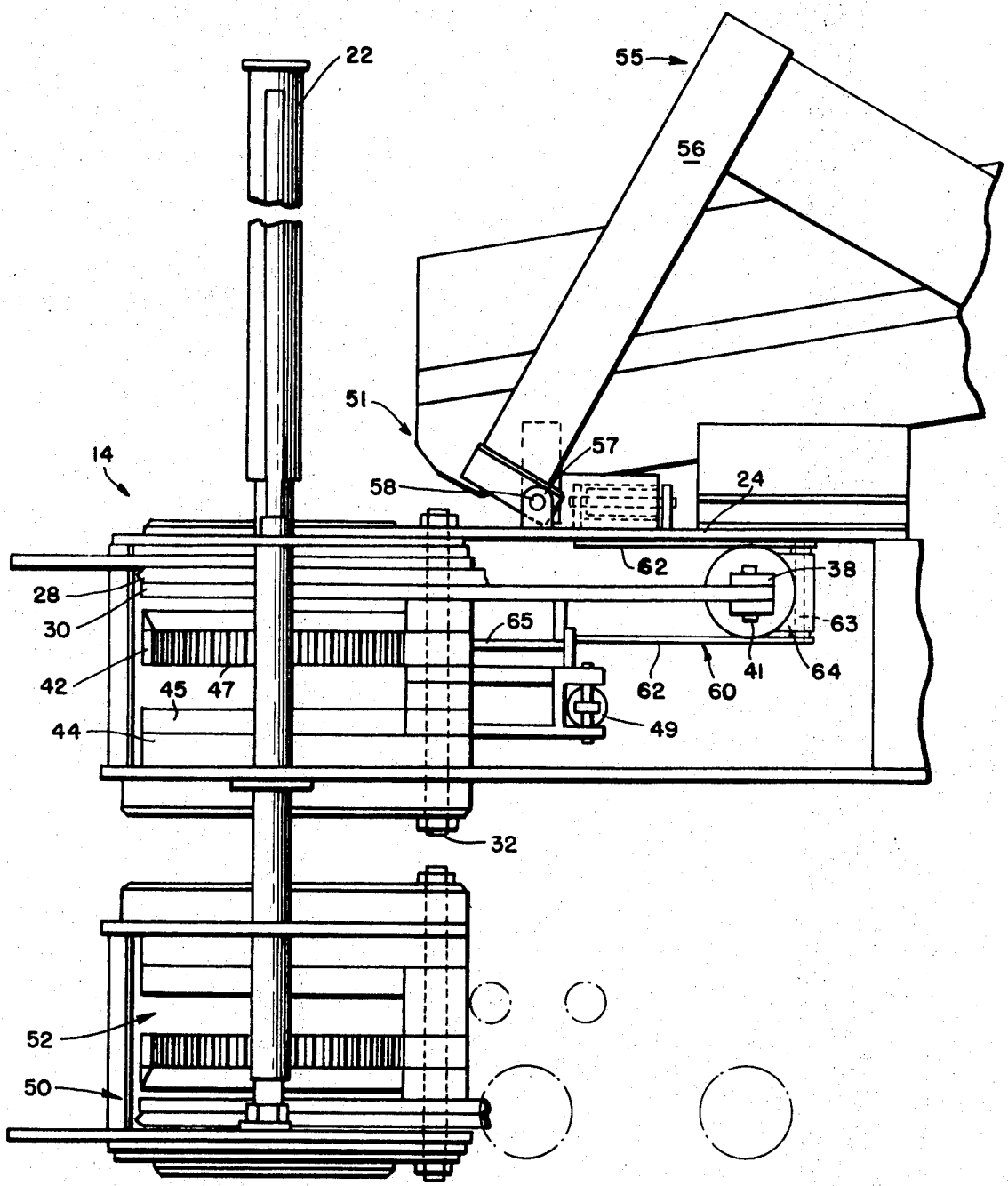
FIG. 4 is a side view of the tree shear and clamp assembly shown in FIG. 2.

As best seen in FIG. 4, to suspend the tree shear and clamp assembly 14 on the boom 12, a "pendulum-type" connection assembly 51 is provided. This assembly includes a generally L-shaped support beam 55, or sub-boom, rigidly connected to the upper end of the boom 12. The free end of the short leg 56 of the support beam 55 is downwardly directed and is provided with an aperture 57 for pivotal reception of horizontally and laterally directed pivot pins 58 connected to the frame 24. It is of importance that the connection assembly 51 be positioned so as to directly overlie the center of gravity of the shear and clamp assembly 14. In this manner, regardless of the vertical angular orientation of the boom 12, which, of course, varies as the apparatus is moved down a standing tree, the shear and clamp assembly 14 remains in a horizontal position convenient for embracing a standing tree.

Operation of the device as thus far described may be summarized as follows: Any suitable conventional hydraulic control system (not shown) may be manipulated by an operator positioned on the vehicle 10 to adjust the boom angle and length to position the shear and clamp assembly 14 adjacent the top of a tree, as shown in FIG. 1. The hydraulic control may be then operated to set the upper clamp and place the hydraulic boom in a "float" condition wherein the weight of the device is supported entirely on the tree. The upper shear may then be partially closed to partially embed the same into the tree to aid in fixing the upper section of the device to the tree during the subsequent delimbing and scoring operation. The vertical cylinders may be then extended thereby delimbing and scoring that portion of the tree embraced by the lower section during its descent. The lower clamp may be then actuated, the upper shear closed to completely sever a portion of the tree, the upper clamp and shear opened, the vertical cylinders retracted and the operation repeated until the entire standing tree has been sectionalized or bucked. Severed bolts are directed into the chute by the kicker and conveyed to a collection point.

This operational sequence may be programmed or performed automatically as by electric or fluidic control means after initial placement of the device for the topping operation. However, to assure proper orientation, and wedging action of the device, as well as proper bolt length and felling direction, it is important that the two blades of each shear act in unison. Should one blade move to a greater extent than the other, the overall device might tend to rotate about the axis of the tree and thereby hinder smooth step-by-step operation. This problem is particularly critical because the entire device is supported on the tree to be harvested. Such unitary blade movement does necessarily occur because it sometimes happens that one blade of a pair requires less hydraulic force or pressure to move than the other, which may encounter an added resistance. This fact, coupled with the consideration that hydraulic pressure in a conventional hydraulic system increases in magnitude only to an extent required to generate a force necessary to perform that portion of the work immediately at hand, results in a condition wherein one blade of a pair may move more than the other.

To achieve equalized movement of each shear blade of a pair, the present invention provides a shear blade movement equalizing linkage 60 (FIGS. 3 and 5) which functions in a manner akin to a parallel linkage. A pair of vertically spaced equalizing rods 62 are provided, outer ends of which are pivotally connected by pins 63 to a pair of frame brackets 65 rigid with frame 24. The inner ends of the rods 62 are pivotally connected by a pin 66 to a cylinder extension 64 rigidly projecting from the rear of upper shear cylinder 38.

Referring to FIG. 3, it should be noted that a line drawn between the central axes of vertical pivot pin 32 and cylinder pin 41 is parallel to a similar line drawn between pins 63 and 66. Because of a parallel linkage effect, the rear end 36 of the shear blade 30 and rod 62 are maintained parallel at all times. Any separate movement of either blade would require pivotal movement of the cylinder 38 about a vertical axis of either pin 39 and 41. For example, if the blade 28 tends to move prior to like movement of the blade 30, as by pivoting the upper shear cylinder 38 about the cylinder pin 41, such pivoting of the cylinder 38 would require pivoting of the equalizing rod 62 which is not geometrically possible. Therefore, cylinder pivoting is prohibited and no movement of the blades will take place until adequate hydraulic pressure is developed to move both blades in a like manner.

Because of this parallel linkage construction, the longitudinal axes of the shear cylinder 38 is maintained perpendicular to the front to rear, central axis of the overall device and equalized movement of each blade of a pair is achieved.

A similar equalizing rod 68 is connected to one blade of the lower shear 52 in a manner similar to that described in connection with the upper shear.

While in the foregoing detailed description reference has been made to but one specific embodiment of the present invention, it should be understood that the structure and operation thereof may be varied by those skilled in the art without departing from the spirit and scope of the present invention which is to be defined by the following claims.

I claim:
1. A tree harvesting device including:
    (a) a frame;
    (b) first and second shear blades moveably mounted on said frame;
    (c) motor means for moving said blades;
    (d) equalizing means pivotally connected to said frame and said motor means for maintaining movement of said first and second shear blades in unison.
2. A tree harvesting device according to claim 1 wherein said blades are pivotally mounted on said frame for pivoting about a pivot axis, said blades further including extension means rigid therewith, said extension means having a longitudinal axis intersecting said pivot axis, and said equalizing means including rod means having a longitudinal axis adapted to be maintained parallel to said longitudinal axis of said extension means.
3. A tree harvesting device according to claim 2 wherein said motor means comprises fluid motor means.
4. A tree harvesting device according to claim 3 further including a tree clamp positioned adjacent said shear blades, and fluid motor means for actuating said clamp.
5. A tree harvesting device according to claim 4, further including second shear and clamp means positioned below said first and second shear blades, and fluid motor means connecting said second shear and clamp means to said frame for relative vertical movement.
6. A tree harvesting device according to claim 5 further including telescopic boom means, chute means connected to said boom means adapted to receive portions of a tree sheared by said shear blades, and kicker means adapted to urge shear portions of the tree into said chute means.
7. A tree harvesting device according to claim 3 wherein said fluid motor means includes double-acting hydraulic cylinder means, one end of which is connected to one of said shear blades and the other end of which is connected to the other of said shear blades.

References Cited
UNITED STATES PATENTS

| | | | |
|---|---|---|---|
| 2,529,934 | 11/1950 | Gracey et al. | 144—34 |
| 2,930,122 | 3/1960 | Pfundt | 144—2 |

GERALD A. DOST, Primary Examiner

U.S. Cl. X.R.

144—34